(12) United States Patent
Spamer et al.

(10) Patent No.: US 8,678,427 B1
(45) Date of Patent: Mar. 25, 2014

(54) RELEASABLE CLIP ASSEMBLY FACILITATING TRIM PANEL MOVEMENT

(71) Applicant: Toyota Moter Engineering & Manufacturing North America, Inc., Erlanger, KY (US)

(72) Inventors: Carl D. Spamer, Brighton, MI (US); Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/655,889

(22) Filed: Oct. 19, 2012

(51) Int. Cl.
 *B60R 21/16* (2006.01)
(52) U.S. Cl.
 USPC ........................................ 280/728.2
(58) Field of Classification Search
 USPC ................ 280/728.2, 728.1, 730.2, 728.3
 See application file for complete search history.

(56) References Cited

U.S. PATENT DOCUMENTS

| | | | |
|---|---|---|---|
| 5,613,701 A | 3/1997 | Bentley et al. | |
| 5,765,862 A | 6/1998 | Bentley | |
| 5,876,060 A | 3/1999 | Davidson et al. | |
| 6,196,574 B1 | 3/2001 | Stavermann | |
| 6,234,515 B1 * | 5/2001 | Iwanaga | 280/728.2 |
| 6,283,498 B1 | 9/2001 | Breitweg | |
| 6,296,269 B1 * | 10/2001 | Nagai et al. | 280/728.2 |
| 6,325,415 B1 | 12/2001 | Zelinski et al. | |
| 6,402,188 B1 | 6/2002 | Pasch | |
| 6,431,584 B1 * | 8/2002 | Nagasawa et al. | 280/728.2 |
| 6,431,585 B1 | 8/2002 | Rickabus | |
| 6,485,047 B2 | 11/2002 | Belanger, Jr. et al. | |
| 6,565,117 B2 | 5/2003 | Kubota et al. | |
| 6,581,958 B2 | 6/2003 | Holtz | |
| 6,616,182 B2 | 9/2003 | Woolley et al. | |
| 6,739,619 B2 * | 5/2004 | Mueller | 280/730.2 |
| 6,913,280 B2 | 7/2005 | Dominissini et al. | |
| 7,168,730 B2 | 1/2007 | Seo | |
| 7,210,700 B2 | 5/2007 | Zagrodnicki et al. | |
| 7,234,725 B2 | 6/2007 | Welford | |
| 7,290,795 B2 * | 11/2007 | Kawai et al. | 280/730.2 |
| 7,338,068 B2 * | 3/2008 | Kawai et al. | 280/728.2 |
| 7,340,808 B2 * | 3/2008 | Baekelandt | 24/453 |
| 7,581,749 B2 * | 9/2009 | Robins | 280/728.2 |
| 7,793,972 B2 | 9/2010 | Downey | |
| 7,931,295 B2 * | 4/2011 | Inui et al. | 280/730.2 |
| 7,976,056 B2 * | 7/2011 | Kirchen et al. | 280/728.2 |
| 8,181,986 B2 | 5/2012 | Schlemmer | |
| 8,430,421 B2 * | 4/2013 | Kirchen et al. | 280/728.2 |

(Continued)

FOREIGN PATENT DOCUMENTS

JP 2002-211345 7/2002

*Primary Examiner* — Faye M. Fleming
(74) *Attorney, Agent, or Firm* — Dinsmore & Shohl LLP

(57) ABSTRACT

A vehicle body assembly includes a body structure, a trim panel connected to the body structure and an air bag located between the body structure and the trim panel. A releasable clip assembly connects the body structure and the trim panel. The releasable clip assembly includes a first mating component connected to the body structure and a second mating component connected to the trim panel. The second mating component has a lock position and a release position relative to the first mating component. In the lock position, the second mating component is engaged with the first mating component. The second mating component moves to the release position relative to the first mating component with movement of the trim panel during deployment of the air bag to release the second mating component from the first mating component.

19 Claims, 7 Drawing Sheets

(56) References Cited

U.S. PATENT DOCUMENTS

| | | |
|---|---|---|
| 2003/0030253 A1* | 2/2003 | Galmiche et al. .......... 280/728.2 |
| 2004/0188985 A1 | 9/2004 | Nagata |
| 2005/0023811 A1 | 2/2005 | Thomas |
| 2006/0237950 A1 | 10/2006 | Worrell et al. |
| 2007/0075531 A1* | 4/2007 | Tsuge ....................... 280/730.2 |
| 2007/0096440 A1 | 5/2007 | Purvis et al. |
| 2008/0001384 A1 | 1/2008 | Catron et al. |
| 2009/0014988 A1 | 1/2009 | Takimoto et al. |
| 2010/0199464 A1 | 8/2010 | Sano |

* cited by examiner

US 8,678,427 B1

RELEASABLE CLIP ASSEMBLY FACILITATING TRIM PANEL MOVEMENT

TECHNICAL FIELD

The present specification generally relates to clip assemblies used to secure trim panels and, more particularly, to a releasable clip assembly that facilitates trim panel movement.

BACKGROUND

Air bag deployment systems are frequently provided within vehicles that deploy air bags for occupant safety during a collision. In the past, air bags were commonly used within a steering wheel on the driver side of the vehicles and within a dashboard on the passenger side of the vehicles. Over time, air bags have been provided at various locations throughout the vehicles, often hidden behind interior trim panels. As can be appreciated, the trim panels that conceal air bags should be able to release the air bags during their deployment, while withstanding ordinary wear and tear that may occur throughout the lifetime of the vehicle during times when the air bags are not deployed. Thus, clip assemblies are desired that can both hold a trim panel in place during normal operation of the vehicle, while facilitating movement of the trim panel should an air bag behind the trim panel be deployed.

SUMMARY

In one embodiment, a vehicle body assembly includes a body structure, a trim panel connected to the body structure and an air bag located between the body structure and the trim panel. A releasable clip assembly connects the body structure and the trim panel. The releasable clip assembly includes a first mating component connected to the body structure and a second mating component connected to the trim panel. The second mating component has a lock position and a release position relative to the first mating component. In the lock position, the second mating component is engaged with the first mating component. The second mating component moves to the release position relative to the first mating component with movement of the trim panel during deployment of the air bag to release the second mating component from the first mating component.

In another embodiment, a releasable clip assembly is provided that connects a body structure and a trim panel of a vehicle. The releasable clip assembly includes a first mating component comprising an anchor body. A second mating component includes a bracket body having a slot that is sized to receive the anchor body of the first mating component. The second mating component has a lock position and a release position relative to the first mating component. The slot defines a lengthwise receiving direction through which the bracket body receives the anchor body of the first mating component in the lock position. In the lock position, the second mating component is engaged with the first mating component within the slot and the second mating component has the release position where the second mating component moves in a transverse direction relative to the lengthwise receiving direction to the release position.

In another embodiment, a method of deploying an air bag located between a body structure and a trim panel is provided. The method includes deploying an air bag. A releasable clip assembly is released that connects the body structure and the trim panel. The releasable clip assembly includes a first mating component connected to the body structure and a second mating component connected to the trim panel. The second mating component has a lock position and a release position relative to the first mating component. In the lock position, the second mating component engages the first mating component. The second mating component moves to the release position relative to the first mating component with movement of the trim panel during deployment of the air bag to release the second mating component from the first mating component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to releasable clip assemblies that facilitate trim panel movement during air bag deployments. The releasable clip assemblies include a first mating component that is connected to a body structure of a vehicle and a second mating component that is connected to the trim panel. The second mating component has a lock position that locks the trim panel in place relative to the body structure. The second mating structure moves to an unlock position relative to the first mating component with movement of the trim panel when the air bag is deployed.

Figure 1:
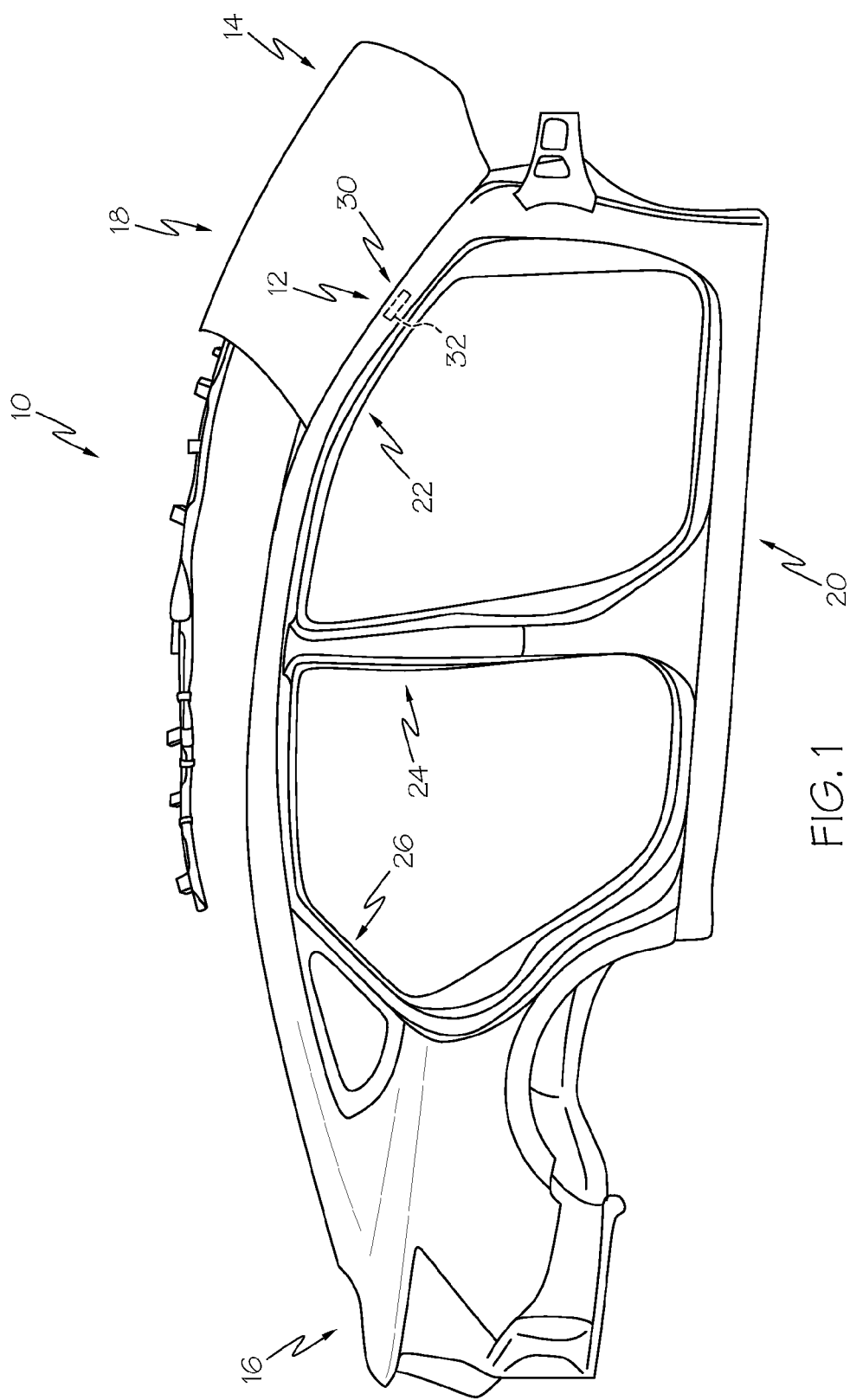
FIG. 1 is a perspective view of a vehicle body assembly according to one or more embodiments described herein.

Referring to FIG. 1, a vehicle body assembly 10 includes a body structure 12 including a front 14, a rear 16, a driver side 18 and a passenger side 20. The driver side 18 and the passenger side 20 include an A-pillar 22, a B-pillar 24 and a C-pillar 26. The A-pillar 22, B-pillar 24 and C-pillar 26, among other things, provide supports for windows of the vehicle body assembly 10. In some embodiments, the vehicle body assembly 10 may also include a D-pillar, such as with SUVs and station wagons. While only the passenger side pillars 22, 24 and 26 are illustrated, the releasable clip assemblies described herein may also be used with the driver side pillars. Further, the releasable clip assemblies may be used to connect various non-pillar trim panels to a variety vehicle body structures.

Figure 2:
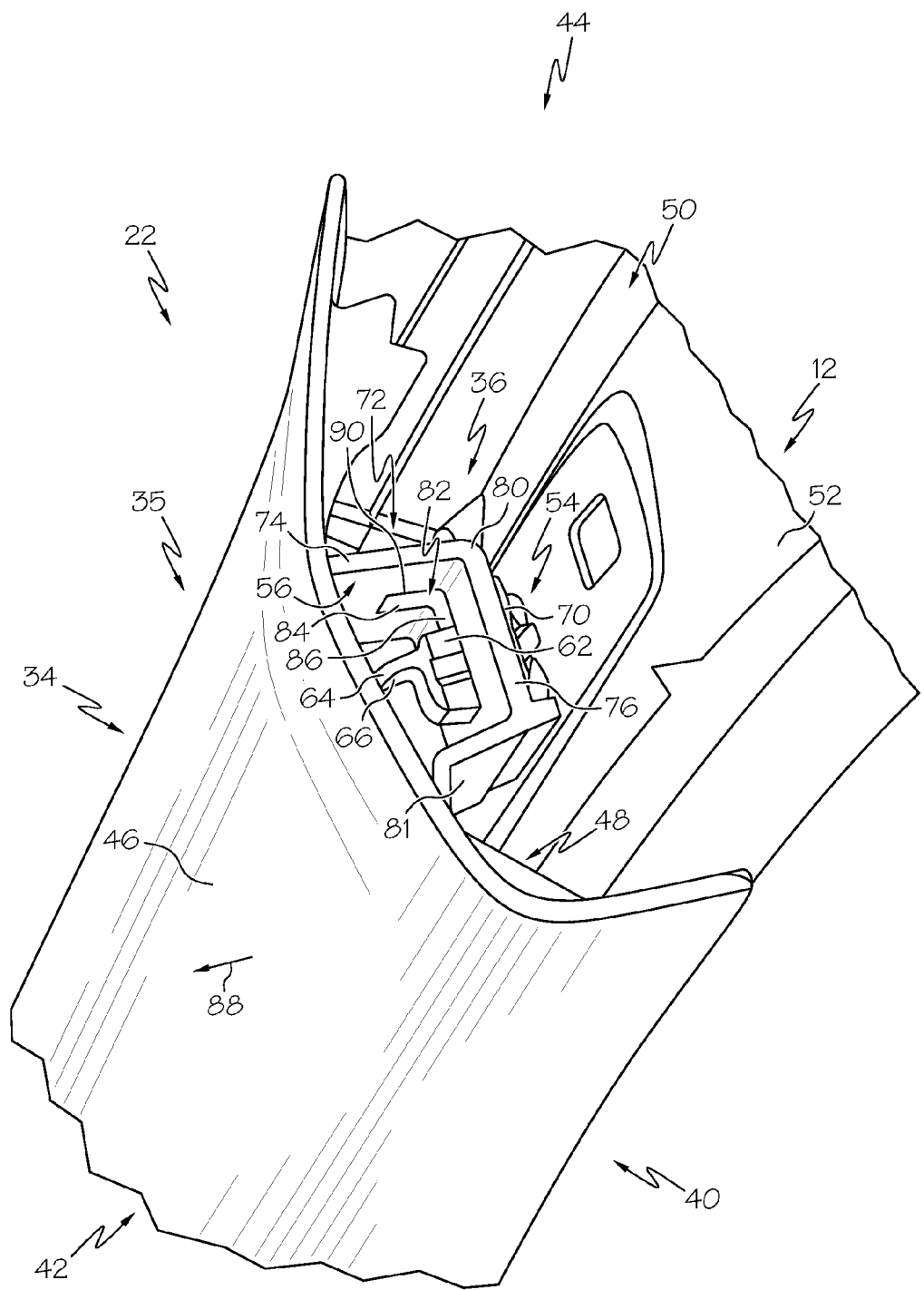
FIG. 2 is a partial, perspective view of an A-pillar including a trim panel connected to a body structure using a releasable clip assembly according to one or more embodiments described herein.
Figure 3:
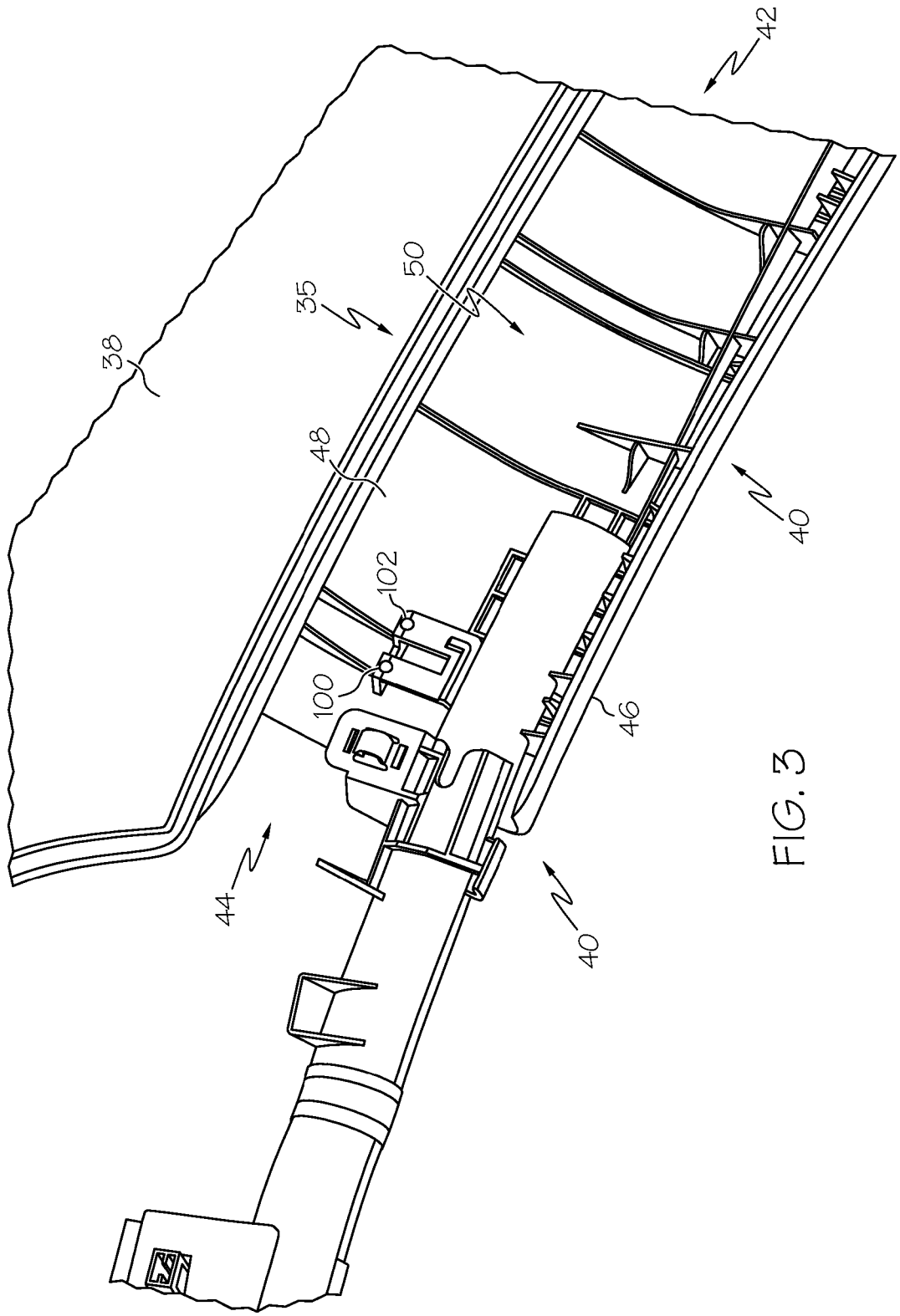
FIG. 3 is a partial side view of the trim panel of FIG. 2 according to one or more embodiments described herein.

One or more of the A-pillar 22, B-pillar 24 and C-pillar 26 may include an air bag assembly 30 including an air bag 32. In the illustrated embodiment, the A-pillar 22 includes the air bag 32. Referring to FIG. 2, the A-pillar 22 includes the body structure 12 and a trim panel 34 connected thereto by a releasable clip assembly 36. Referring also to FIG. 3, the trim panel 34 includes a forward portion 35 that faces toward the front of the vehicle body 10 and window 38 (FIG. 3), a rearward portion 40 that faces toward the rear of the vehicle body 10, a lower portion 42 that faces toward a dashboard and an upper portion 44 that faces toward a headliner. The trim panel 34 further includes an outer surface 46 that faces toward an interior of the vehicle body 10 and an inner surface 48 that faces toward an exterior of the vehicle body 10 and the body structure 12, which is not visible by the occupants.

The trim panel 34 may be formed of any suitable materials, such as polypropylene, polyethylene or any other suitable polymers and/or elastomers. The trim panel 34 may be formed using any suitable technique, such as molding (e.g., injection molding). The body structure 12 may likewise be formed of any suitable materials, such as sheet metal and/or plastics and be formed of any suitable process, or combination of processes, such as machining, stamping, rolling, bending, molding, etc.

Referring particularly to FIG. 3 illustrating the trim panel 34 in isolation with the window 38, a chamber 50 is provided between the inner surface 48 of the trim panel 34 and an inner surface 52 of the body structure 12 (FIG. 2). The air bag assembly 30 including the air bag 32 is located within the chamber 50 and between the trim panel 34 and the body structure 12.

Figure 4:
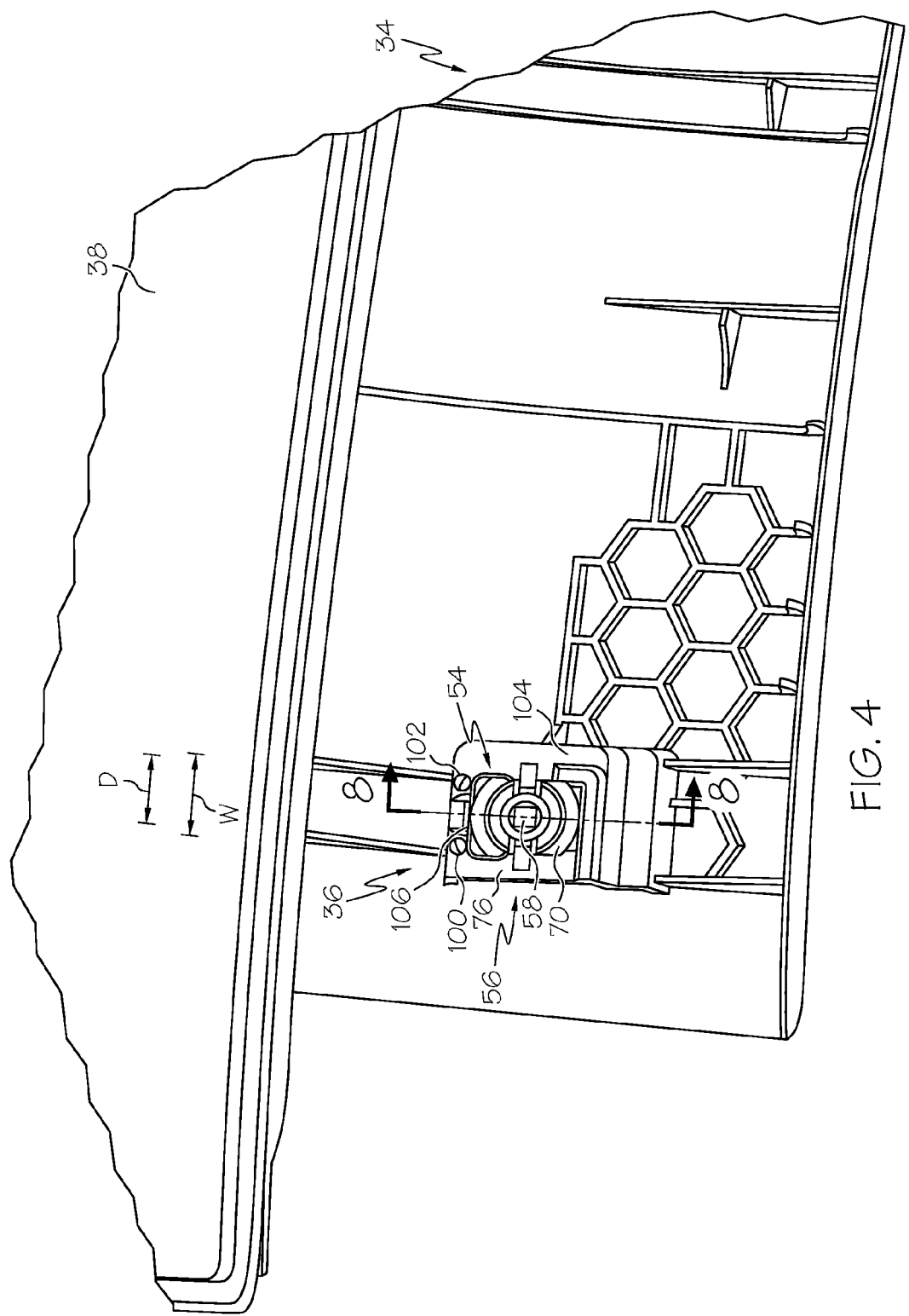
FIG. 4 is a partial side view of the trim panel of FIG. 3 including the releasable clip assembly according to one or more embodiments described herein.
Figure 8:
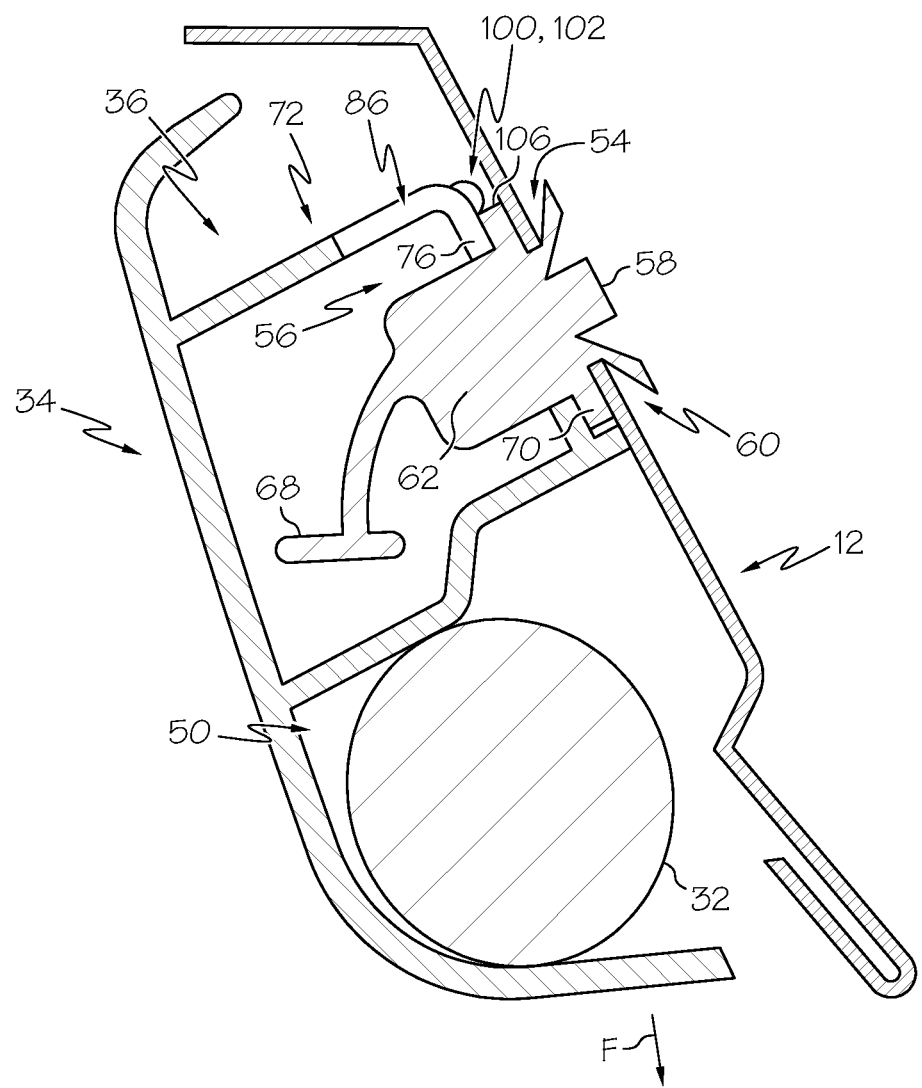
FIG. 8 is a diagrammatic section view of the trim panel, body structure and releasable clip assembly of FIG. 2 with the releasable clip assembly in a lock position.

Referring again to FIG. 2 and also to FIG. 4, the trim panel 34 is releasably connected to the body structure 12 using the releasable clip assembly 36. The releasable clip assembly includes a first mating component 54 that is connected to the body structure 12 and a second mating component 56 that is connected to the trim panel 34. The first mating component 54 includes a body structure connecting end 58 that is received within an opening 60 (FIG. 8) provided in the body structure 12 and an anchor body 62 that connects to the first mating component 54. A flange stop structure 70 extends outwardly from the anchor body 62 that restricts insertion of the body structure connecting end 58 into the opening 60 in the body structure 12. A tether 64 is connected to the anchor body 62 that includes a flexible connector line 66 connected to the anchor body 62 and an enlarged end portion 68 (FIG. 8).

As shown in FIG. 2, the second mating component 56 includes a bracket body 72 including a first leg 74 that extends outwardly from the inner surface 48 of the trim panel 34 in a somewhat vehicle widthwise direction and a second leg 76 that extends outwardly from the first leg 74 in a generally vehicle lengthwise (and vertical) direction. The second leg 76 is connected to the first leg 74 by a bend 80 (e.g., a 90 degree bend) forming a somewhat inverted L-shaped bracket body 72. In some embodiments, a third support leg 81 may also be provided. The second mating component 56 may be formed integrally (e.g., molded) with the trim panel 34. A slot 82 extends through the bracket body 72 that is sized to receive the anchor body 62 in a lengthwise receiving direction in a releasable fashion. The slot 82 includes a slot portion 84 extending through the first leg 74 of the bracket body 72 and a slot portion 86 extending through the second leg 76 of the bracket body 72. The slot portions 84 and 86 have widths that are sized to slidingly receive the anchor body 62 therein. In some embodiments, the slot portion 86 may have a width that inhibits movement of the trim panel 34 in the vehicle widthwise direction (e.g., in the direction of arrow 88) due to engagement with the anchor body 62 of the first mating component 54. As can be seen by FIG. 2, the slot 82 has an open end 90 that allows the anchor body 62 to pass therethrough and out of the slot 82 to release the trim panel 34 from the body structure 12.

Referring to FIG. 4, the second mating component 56 includes release projections 100 and 102 that extend outwardly from an inner face 104 of the second leg 76 toward the body structure 12. FIG. 4 illustrates the first mating component 54 and the second mating component 56 in their lock positions with the anchor body 62 received and seated within the slot portion 86 (see also FIG. 2). The release projections 100 and 102 are located on opposite sides of the slot portion 86 and adjacent an edge 106 of the flange stop structure 70 with the first and second mating components 54 and 56 in their lock positions. The release projections 100 and 102 may be equidistant from the slot portion 86 and be spaced a distance D that is less than a width W of the flange stop structure 70.

Figure 5:
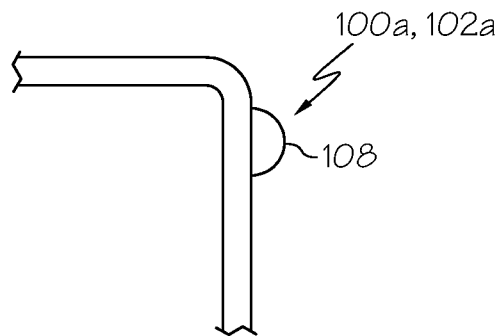
FIG. 5 is a side view of a bracket body including a release projection according to one or more embodiments described herein.
Figure 6:
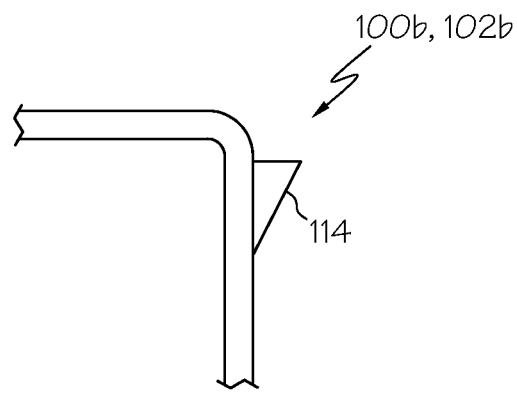
FIG. 6 is a side view of another bracket body including a release projection according to one or more embodiments described herein.
Figure 7:
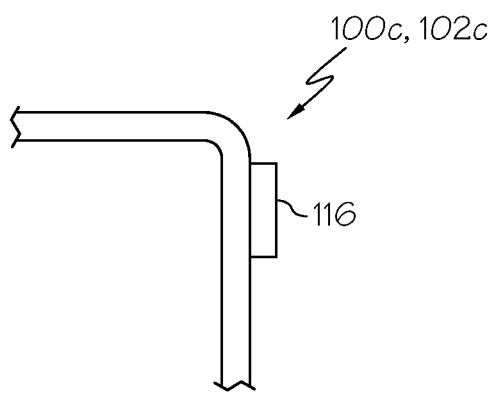
FIG. 7 is a side view of another bracket body including a release projection according to one or more embodiments described herein.

The release projections 100 and 102 may be of any suitable shape. For example, referring to FIG. 5, the release projections 100a, 102a have a dome-shape having a rounded contour 108. Referring to FIG. 6, the release projections 100b and 102b have a ramp-shape having an angled contour 114. Referring to FIG. 7, the release projections 100c and 102c have a square-shape having a flat contour 116. The release projections 100 and 102 may be formed with the second mating component 56, or the release projections 100 and 102 may be connected to the second mating component 56 at the locations shown in FIG. 4.

Figure 9:
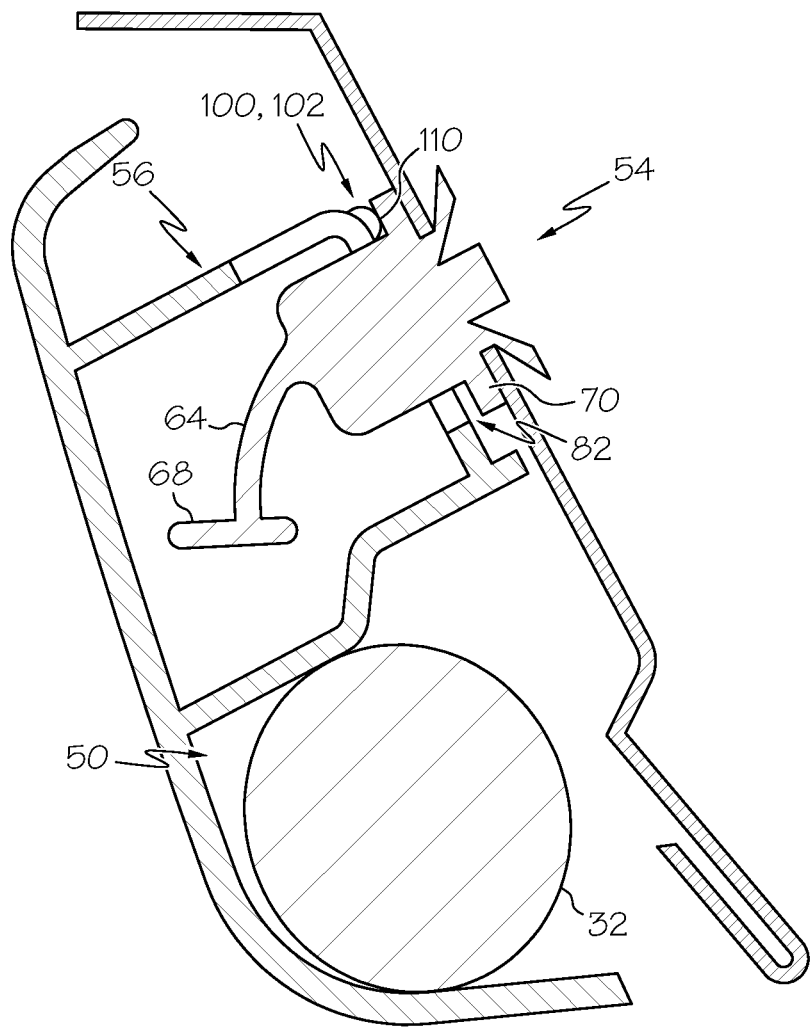
FIG. 9 is a diagrammatic section view of the trim panel, body structure and releasable clip assembly of FIG. 8 with the releasable clip assembly in a release position.

Referring to FIG. 8, the releasable clip assembly 36 is illustrated diagrammatically with the first and second mating components 54 and 56 in their lock positions. In the lock position, the anchor body 62 is received and seated within the slot portion 86 of the second leg 76 of the bracket body 72. The release projections 100 and 102 are located adjacent the edge 106 of the flange stop structure 70. During deployment, the air bag 32 inflates within the chamber 50. As the air bag 32 inflates, a force F is applied to the trim panel 34. Referring to FIG. 9, the trim panel 34 is allowed to move to the position of FIG. 9, which forces the release projections 100 and 102 upon an inner face 110 of the flange stop structure 70, moving in a direction generally transverse to the lengthwise receiving direction of the slot 82. In a release position shown by FIG. 9, the second mating component 56 can continue movement with the trim panel 34 until the anchor body 62 is removed from the slot 82. Once the anchor body 62 is removed from the slot 82, the trim portion 34 can continue movement to allow the air bag 32 room to escape from the chamber 50. The tether 64 includes the enlarged end portion 68 that engages the bracket body 72 to limit movement of the trim panel 34 from the body structure 12.

The above-described releasable clip assemblies allow for limited release of the trim panel from the body structure to facilitate deployment of the air bag located between the trim panel and the body structure. Such an arrangement can increase reliability in the deployment of the air bag be providing added space through which the air bag can travel. The releasable clip assemblies utilize movement of the trim panel due to a force on the trim panel provided by the inflating air bag to release the releasable clip assemblies.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle body assembly comprising:
a body structure;
a trim panel connected to the body structure;
an air bag located between the body structure and the trim panel; and
a releasable clip assembly that connects the body structure and the trim panel, the releasable clip assembly comprising:
a first mating component comprising an anchor body connected to the body structure; and
a second mating component having a bracket body including a first leg connected to the trim panel and a second leg connected to the first leg by a bend and engaged with the anchor body;
wherein the anchor body passes from the second leg through an open end in the first leg of the second mating component with movement of the trim panel and the second mating component during deployment of the air bag to release the second mating component from the anchor body.

2. The vehicle body assembly of claim 1, wherein the bracket body having a slot that is sized to receive the anchor body of the first mating component.

3. The vehicle body assembly of claim 2, wherein the slot defines a lengthwise receiving direction through which the bracket body receives the anchor body of the first mating component in the lock position.

4. The vehicle body assembly of claim 3, wherein the slot is continuous and extends through the first leg, the second leg and the bend.

5. The vehicle body assembly of claim 4, wherein the second leg includes a release projection that engages the first mating component to move the second mating component outwardly away from the body structure relative to the first mating component with movement of the trim panel during deployment of the air bag.

6. The vehicle body assembly of claim 1, wherein the first mating component comprises a tether connected to the anchor body.

7. The vehicle body assembly of claim 6, wherein the tether comprises an enlarged portion that is sized to engage the bracket body with the anchor body removed from the slot.

8. The vehicle body assembly of claim 1, wherein the second mating component is integrally molded with the trim panel.

9. A releasable clip assembly that connects a body structure and a trim panel of a vehicle, the releasable clip assembly comprising:
a first mating component comprising an anchor body; and
a second mating component comprising a bracket body having a first leg and a second leg having a slot that is sized to receive the anchor body of the first mating component, the second mating component having a lock position and a release position relative to the first mating component, wherein the slot of the second leg defines a lengthwise receiving direction through which the bracket body receives the anchor body of the first mating component in the lock position;
wherein, in the lock position, the second leg of the second mating component is engaged with the first mating component within the slot and the second mating component having the release position where the second mating component moves in a transverse direction relative to the lengthwise receiving direction to the release position to allow the anchor body to pass through an open end in the first leg of the second mating component to release the second mating component from the anchor body.

10. The releasable clip assembly of claim 9, wherein the second leg being connected to the first leg by a bend.

11. The releasable clip assembly of claim 10, wherein the slot extends through both the first leg and the second leg forming the open end.

12. The releasable clip assembly of claim 11, wherein the second leg includes a release projection that engages the first mating component to move the second mating component in the transverse direction.

13. The releasable clip assembly of claim 9, wherein the first mating component comprises a tether connected to the anchor body.

14. The releasable clip assembly of claim 13, wherein the tether comprises an enlarged portion that is sized to engage the bracket body with the anchor body removed from the slot.

15. A method of deploying an air bag located between a body structure and a trim panel, the method comprising:
deploying an air bag; and
releasing a releasable clip assembly that connects the body structure and the trim panel, the releasable clip assembly comprising a first mating component comprising an anchor body connected to the body structure and a second mating component having a bracket body including a first leg connected to the trim panel and a second leg connected to the first leg by a bend and engaged with the anchor body, wherein, the anchor body passes from the second leg through an open end in the first leg of the second mating component with movement of the trim panel and the second mating component during deployment of the air bag to release the second mating component from the anchor body.

16. The method of claim 15, wherein the slot defines a lengthwise receiving direction through which the bracket body receives the anchor body of the first mating component.

17. The method of claim 16, wherein the step of releasing the releasable clip assembly comprises moving the anchor body in a direction transverse to the lengthwise receiving direction.

18. The method of claim 16, wherein the second leg being connected to the first leg by a bend, wherein the slot is continuous and extends through the first leg, the second leg and the bend.

19. The vehicle body assembly of claim 1, wherein the anchor body passes through the second mating component in a direction opposite of a development direction of the air bag during deployment of the air bag.

* * * * *